US011388267B2

(12) United States Patent
Fitterer et al.

(10) Patent No.: US 11,388,267 B2
(45) Date of Patent: Jul. 12, 2022

(54) MIXED AVIONIC COMMUNICATION SYSTEM OF TYPES ARINC 664 P7 AND ETHERNET WITH PREDETERMINED ROUTING

(71) Applicant: THALES, Courbevoie (FR)

(72) Inventors: Eric Fitterer, Mérignac (FR); Stéphane Monnier, Mérignac (FR); Arnaud Sitbon, Mérignac (FR); Yves Finaz, Mérignac (FR); Frédéric Laloire, Mérignac (FR)

(73) Assignee: THALES, Courbevoie (FR)

( * ) Notice: Subject to any disclaimer, the term of this patent is extended or adjusted under 35 U.S.C. 154(b) by 201 days.

(21) Appl. No.: 16/726,617

(22) Filed: Dec. 24, 2019

(65) Prior Publication Data
US 2020/0213425 A1 Jul. 2, 2020

(30) Foreign Application Priority Data

Dec. 26, 2018 (FR) ..................... 18 74166

(51) Int. Cl.
*H04L 69/18* (2022.01)
*H04L 41/0896* (2022.01)
(Continued)

(52) U.S. Cl.
CPC .......... *H04L 69/18* (2013.01); *H04L 41/0896* (2013.01); *H04L 45/52* (2013.01);
(Continued)

(58) Field of Classification Search
CPC ..... H04L 69/18; H04L 41/0896; H04L 45/52; H04L 45/745; H04L 47/283;
(Continued)

(56) References Cited

U.S. PATENT DOCUMENTS

2014/0226522 A1 8/2014 Anandappan et al.
2015/0103825 A1 4/2015 Bobrek
(Continued)

FOREIGN PATENT DOCUMENTS

EP 2 139 172 A1 12/2009
EP 2 536 070 A1 12/2012
(Continued)

OTHER PUBLICATIONS

System level scheduling of mixed criticality traffics in avionics networks Yao et al. IEEE access Oct. 6, 2016 (Year: 2016).*
(Continued)

*Primary Examiner* — Rina C Pancholi
(74) *Attorney, Agent, or Firm* — ArentFox Schiff LLP (57) ABSTRACT

The present invention relates to an avionic communication system that comprises a plurality of switches and a plurality of equipment units.
Each equipment unit is capable of generating digital data that are present in the form of a plurality of frames of the first type that are in compliance with a first protocol, or of the second type that are in compliance with a second protocol. Each switch and each receiving equipment unit are configured so as to determine the type of each frame received and, as a function of the determined type, to process this frame in accordance with the corresponding protocol, each frame of the first type being processed on a prioritised basis in relation to each frame of the second type. The first protocol is of the type ARINC 664 P7 and the second protocol is of the type Ethernet with predetermined routing.

13 Claims, 3 Drawing Sheets

(51) Int. Cl.
*H04L 45/52* (2022.01)
*H04L 45/745* (2022.01)
*H04L 47/283* (2022.01)
*H04L 49/351* (2022.01)
*H04L 69/22* (2022.01)

(52) U.S. Cl.
CPC .......... *H04L 45/745* (2013.01); *H04L 47/283* (2013.01); *H04L 49/351* (2013.01); *H04L 69/22* (2013.01)

(58) Field of Classification Search
CPC ..... H04L 49/351; H04L 69/22; H04L 43/026; H04L 67/12; H04L 47/13; H04L 47/2483; H04L 47/805; H04L 49/60; H04L 12/40163; H04L 12/46
See application file for complete search history.

(56) References Cited

U.S. PATENT DOCUMENTS

2016/0294697 A1\* 10/2016 Varadarajan ............ H04L 47/28
2018/0115484 A1\* 4/2018 Ramey .................. H04L 49/351

FOREIGN PATENT DOCUMENTS

| EP | 3 057 273 A1 | 8/2016 |
| EP | 3 076 605 A1 | 10/2016 |
| EP | 3 316 533 A1 | 5/2018 |
| FR | 2 905 047 A1 | 2/2008 |

OTHER PUBLICATIONS

Anonymous, "Time-Triggered Ethernet," SAE International, Aerospace Standard, AS6802 SAE International, 108 Pages Total, XP009514461, (2016).
French Search Report, from the French Patent Office in counterpart French Application No. 1874166, dated Jul. 23, 2019.

\* cited by examiner

MIXED AVIONIC COMMUNICATION SYSTEM OF TYPES ARINC 664 P7 AND ETHERNET WITH PREDETERMINED ROUTING

CROSS-REFERENCE TO RELATED APPLICATIONS

This application claims priority to French Patent Application No. 18 74166, filed on Dec. 26, 2018. The disclosure of the priority application is incorporated in its entirety herein by reference.

FIELD OF THE INVENTION

The present invention relates to a mixed avionics communication system of types ARINC 664 P7 and Ethernet with predetermined routing.

BACKGROUND OF THE INVENTION

In a manner known per se, the ARINC 664 standard makes it possible to implement avionics systems and computer networks. Based on the Ethernet standard, it provides the means in particular to adapt the use of this standard to the avionics context and in particular, to the related avionics constraints.

The ARINC 664 standard is made up of a number of parts, with each part being usable in accordance with the constraints imposed on the data passing through the avionics network that is operationally implemented on the basis of this standard.

Among these various parts, in particular the part referenced as "P7" and generally denoted by "ARINC 664 P7" or "ARINC 664 Part 7" or even "AFDX®", is generally known.

This part P7 can be used to transmit avionics data between different avionics systems that are operationally implementing the essential functions of the aircraft and thus presents the greatest number of constraints.

Thus, an avionics network implemented on the basis of part P7 presents a segregated, redundant and deterministic network. The determinism of this network signifies in particular that each frame transmitted reaches its destination in a known maximum time.

In some avionics networks, it is also possible to use the Ethernet protocol (within the meaning of the IEEE 802.3-2000 standard and subsequent versions) combined with a certain number of additional restrictions imposed by the nature of the corresponding network.

As compared to the part P7 of the ARINC 664 standard, the Ethernet protocol with related restrictions presents fewer constraints and is therefore usable for operationally implementing avionic networks that transmit less sensitive and/or less critical data.

This data generally represent data and information pertaining to maintenance, download and crew service functions relating to different avionics systems. Thus, in the event of loss of this data, they may be retransmitted again without creating considerable risk for the safety of the aircraft.

The additional restrictions imposed on the Ethernet protocol may notably pertain to the manner in which the frames are routed. Thus, for example, this routing may be predetermined within each switch of the network, in accordance with the identifier of the frame.

This is for example the case of the part referenced as "P3" of the ARINC 664 standard which is also based on the Ethernet protocol but which presents fewer constraints in comparison with the part P7 and however recommends a network usage mode that is configured statically for an operational mode on the aircraft.

In an airplane, the ARINC 664 P7 and Ethernet type networks (possibly with additional restrictions) are segregated from each other. This segregation is obtained by using different physical means to implement these networks.

This means in particular that, in order to ensure such segregation, these networks use switches and means of transmission that are physically different.

It is therefore conceivable that this type of segregation involves at least a doubling of each physical component operationally implementing these networks.

This thus then involves many problems in terms of dimensional and space requirements and weight in a structure hosting these networks such as an airplane.

In the state of the art, some examples of networks referred to as mixed networks, that is to say networks which are of both ARINC 664 P7 type and Ethernet type are already known.

Thus, according to a known example, this mixability is achieved by the introduction of a specific gateway between the networks of the two types thereby making it possible to transmit frames between these networks. However, this solution does not reduce the number of physical components used and therefore does not respond to the problems mentioned above relating to dimensional and space requirements and weight.

According to another known example, ARINC 664 P7 and Ethernet mixability with predetermined routing is achieved by using switches that are common to these two types of networks but having ports dedicated to each of these types. Even if this solution serves the purpose of reducing the number of switches used, it does not completely solve the problems relating to dimensional and space requirements and weight because it continues to be necessary to use different transmission means. In addition, this solution significantly increases the number of ports within the same switch which thus makes its structure particularly complex.

SUMMARY OF THE INVENTION

The object of the present invention is to provide a mixed ARINC 664 P7 and Ethernet communication system that makes it possible to use the same switches and the same transmission means for these types of networks, and therefore to more effectively solve the aforementioned problems relating to dimensional or space requirements and weight. In other words, the object of the present invention is to offer a mixed communication system that provides the ability to use for the aforementioned networks the same physical layers that therefore include the switches, the cabling and wiring, and the ports of the common transmitters/receivers.

To this end, the invention relates to an avionics communication system comprising:

a plurality of switches connected to each other in order to form a computer network;

a plurality of equipment units, each equipment unit being a transmitter and/or receiver of digital data and being connected to at least one switch;

the system is such that:

each transmitting equipment unit is capable of generating digital data that are present in the form of a plurality of frames, each frame having an identifier and being of a first type or of a second type, the frames of the first type being in compliance with a first protocol and the frames of the second type being in compliance with a second protocol which is different from the first protocol, with the frames of the same type having the same identifier, thus forming a data flow of this type;

each switch and each receiving equipment unit are configured so as to determine the type of each frame received and, as a function of the determined type, to process this frame in accordance with the first protocol or in accordance with the second protocol, each frame of the first type being processed on a prioritised basis in relation to each frame of the second type; and the first protocol is of the type ARINC 664 P7 and the second protocol is of the type Ethernet with predetermined routing.

According to other advantageous aspects of the invention, the system includes one or more of the following characteristic features, taken into consideration alone or in accordance with any technically possible combination:

each switch is configured so as to determine the type of each frame received based on one field of this frame;

the said field corresponds to a header of the corresponding frame;

each switch is configured so as to apply a filtering operation to each frame of the second type received in accordance with a predetermined configuration table within this switch, each filtering operation being selected from the group of operations comprising:
  identification of the identifier of the corresponding frame and rejection of this frame when its identifier is not expected according to the configuration table;
  identification of the size of the corresponding frame and rejection of this frame when its size exceeds a threshold value determined according to the configuration table;

each transmitting equipment unit is configured so as to transmit the frames of the second type included in the same data or flow with a minimum time delay between frames defined for this data flow and corresponding to a minimum interval of transmission of two consecutive frames of this data flow;

each transmitting equipment unit is configured so as to transmit the frames of the second type included in the same data flow according to a bandwidth defined for this data flow;

the minimum time delay between frames and the bandwidth are defined for each data flow of the second type independently of the bandwidths for the data flows of the first type or as a function of the bandwidths for the data flows of the first type;

each transmitting equipment unit is capable of defining a total bandwidth for all of the second type data flows originating from this transmitting equipment unit independently of the other transmitting equipment units, and from this overall bandwidth, the bandwidth for each data flow originating from this transmitting equipment unit;

each transmitting equipment unit is capable of defining a total bandwidth for all of the second type data flows originating from this transmitting equipment unit; as a function of the total bandwidths determined by the other transmitting equipment units, and based on this total bandwidth, the bandwidth for each data flow originating from this transmitting equipment unit;

the bandwidth for each second type data flow originating from a transmitting equipment unit is defined equitably between all of the second type data flows originating from this transmitting equipment unit or in a weighted manner as a function of the nature of this data flow;

the bandwidth for each second type data flow is defined as a function of the nature of this data flow;

each switch is configured so as to control for each incoming data flow of the second type at least one of the following values:
  bandwidth for this data flow;
  jitter;
  minimum time delay between frames;

each switch comprises a plurality of input ports and a plurality of output ports and is configured so as to route each frame of the second type to one or more output ports determined according to the identifier of this frame, in a predetermined manner;

each switch is configured so as to receive each frame of the second type via an input port determined according to the identifier of this frame, in a predetermined manner;

a priority level is defined for each frame of the first type and for each frame of the second type, the priority level of each frame of the second type being lower than the priority level of each frame of the first type.

BRIEF DESCRIPTION OF THE DRAWINGS

These characteristic features and advantages of the invention will become apparent upon reading the description which follows, given solely by way of non-limiting example, and with reference made to the appended drawings, in which.

DETAILED DESCRIPTION OF SOME EMBODIMENTS OF THE INVENTION

In all the following sections, any mention of a standard, in particular of a computer standard, makes reference to the general principles of this standard which are well known to the person skilled in the art and which are independent of different versions of this standard, unless expressly stated otherwise.

Figure 1:
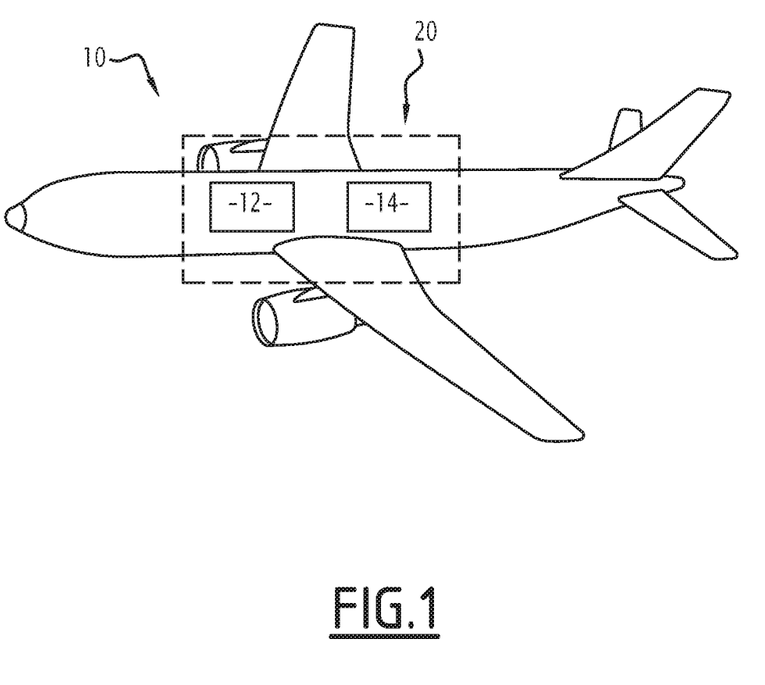
FIG. 1 is a schematic view of an aircraft comprising an avionics network of ARINC 664 P7 type and an avionics network of the type Ethernet with predetermined routing.

FIG. 1 illustrates an aircraft 10 such as an airplane.

The aircraft 10 comprises an avionics network 12 of the type ARINC 664 P7 and an avionics network 14 of the type Ethernet with predetermined routing.

The avionics network 12 provides the means to transmit sensitive data between different avionics systems. The term "sensitive data" is used to refer in particular to any data whose loss or delay in transmission can have an influence on the safety of the aircraft 10.

The avionics network 14 provides the means to transmit data that is less sensitive in comparison with the avionics network 12. Thus, for example, these data correspond to maintenance related data exchanged between the aircraft 10 and the ground control.

According to the invention, the avionic networks 12 and 14 are operationally implemented by the same physical avionics communication system 20.

Figure 2:
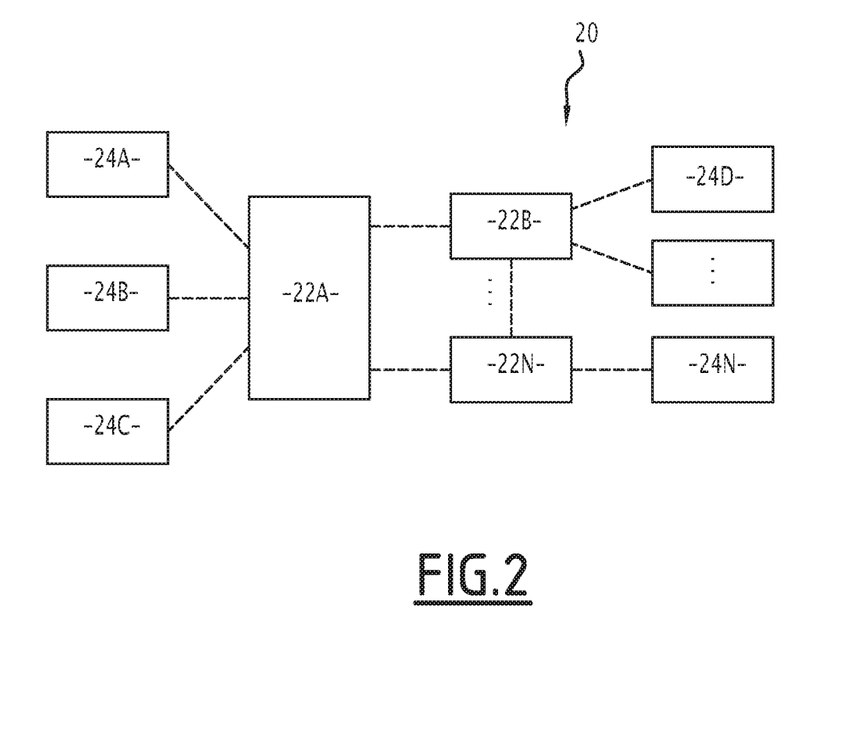
FIG. 2 is a schematic view of a communication system according to the invention, the communication system operationally implementing the avionics networks shown in FIG. 1.

An example of such an avionic communication system 20 is illustrated in FIG. 2.

Thus, with reference to this figure, this communication system 20 comprises a plurality of switches 22A, . . . , 22N, and a plurality of equipment unit 24A, . . . , 24N.

Each equipment unit 24A, . . . , 24N, also known by the accepted term "End System", is integrated into an avionics system and ensures the communication of this system with the networks 12, 14.

Thus, depending on the avionics system within which it is integrated, each equipment unit 24A, . . . , 24N can be a transmitter and/or receiver of digital data.

Each equipment unit 24A, . . . , 24N is connected to at least one of the switches 22A, . . . 22N via the transmission means and via at least one port of this switch. The transmission means present for example a twisted pair cable or any other type of cable that serves to enable bidirectional transmission of data.

Each switch 22A, . . . 22N thus comprises a plurality of input ports and output ports, and a configuration table. Each input port is capable of receiving incoming digital data for subsequent transmission thereof to one or more output ports in accordance with the configuration table of the corresponding switch, as will be explained in more detail in the following section/s.

Each configuration table is determined during the phase of designing of the system 20 and makes it possible to route and control the digital data passing through the corresponding switch, as will be explained in the following section/s.

The switches 22A, . . . 22N are interconnected to each other by the transmission means also having for example a twisted pair cable or any other type of cable that serves to enable bidirectional transmission of data.

According to the invention, the digital data circulating in the communication system 20 is in the form of frames of the first type and frame of the second type.

Each frame of the first type is in compliance with the protocol of the ARINC 664 P7 standard.

Figure 3:
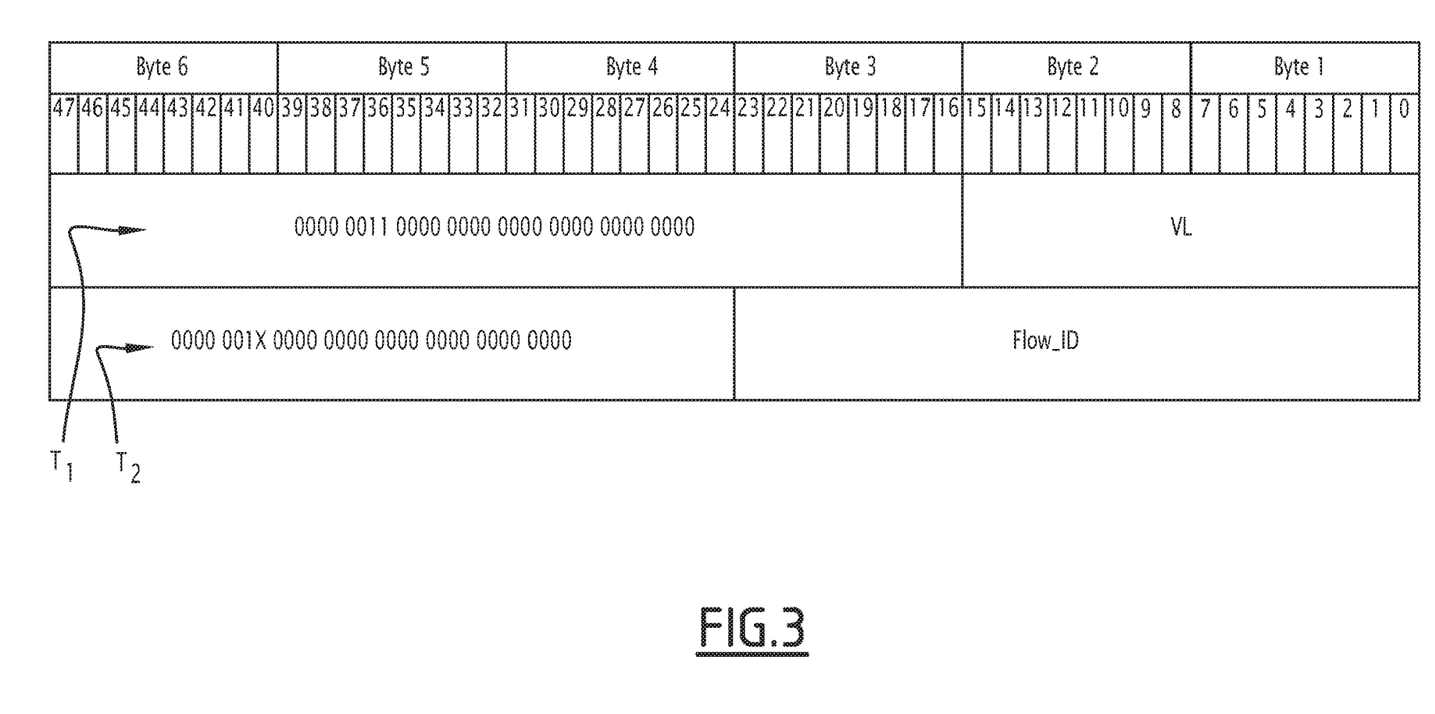
FIG. 3 is a schematic view of frames transmitted by the communication system shown in FIG. 2, according to shown in particular embodiment of this system.

Each frame of the first type includes a header in particular comprising of a field known as "MAC DEST" which is illustrated schematically in FIG. 3 for a frame $T_1$ of the first type.

Thus, as illustrated in this figure, this field "MAC DEST" extends over 6 bytes.

In the case of the frame $T_1$, as is known per se, bytes 3 to 6 denoted in FIG. 3 by the references Byte 3 to Byte 6 are reserved for a particular value, which is common for all the frames of the type ARINC 664 P7. This value is equal to "0000 0011 0000 0000 0000 0000 0000 0000 0000".

Furthermore, as is also known per se, bytes 1 and 2 of the frame $T_1$ denoted in FIG. 3 by the references Byte 1 to Byte 2 correspond to a value VL referred to as "Virtual Link" (as per the commonly accepted terminology) and defining the routing path of the frame.

In addition, the frames of the first type comprising the same value VL form the same data flow of the first type. The value VL is saved and stored in the configuration table of each switch through which the data flow corresponding to this value VL passes and thus makes it possible to route each frame within this switch.

For the purposes and within the meaning of the present invention, the value VL of each frame of the first type is referred to as the identifier of the corresponding frame.

As is known per se, each ARINC 664 P7 type data flow is transmitted by a corresponding transmitting equipment unit 24A, . . . , 24N with a minimum time delay between frames known by the commonly accepted term "BAG" (for "Bandwidth Allocation Gap"). This time delay makes it possible in particular to define a permissible bandwidth for the corresponding data flow.

In addition, as is known per se, a priority level is defined for each frame of the first type according to the value VL of this frame. This priority level is selected, for example, from four possible levels.

Each frame of the second type is in compliance with the protocol of the Ethernet standard (pursuant to the stipulations of the standard IEEE 802.3-2000 and subsequent versions) with predetermined routing.

In the following section(s), the term "predetermined routing", is understood to refer to a routing mode according to which each frame is routed by the switches 22A, . . . , 22N according to predetermined rules.

These predetermined rules are notably saved and stored in the configuration table of each switch 22A, . . . , 22N and define the routing of each frame of the second type within this switch.

Thus, for example, this is the case when the configuration table of each switch 22A, . . . , 22N defines for each frame an input port and one or more output ports, or when the configuration table of each switch 22A, . . . , 22N defines one or more output ports for each frame.

According to one particular embodiment of the invention, the frames of the second type comply with the ARINC 664 P3 protocol.

Each frame of the second type also includes a header comprising bits that are reserved by the IEEE 802.3 standard.

Furthermore, when the frames of the second type are in compliance with the ARINC 664 P3 protocol, this header also includes a field referred to as "MAC DEST" illustrated in FIG. 3 for a frame $T_2$ of the second type.

According to the invention, the header of each frame of the second type and in particular the bytes 3 to 6 thereof, can take any value other than the corresponding bytes of the header of the frames of the first type, that is to say any value other than the value "0000 0011 0000 0000 0000 0000 0000 0000 0000".

This then makes it possible to clearly distinguish with certainty the frames of the first type from the frames of the second type.

In addition, according to the invention, the header of each frame of the second type defines a value Flow_ID referred to as "flow identifier" (or "Flow ID" as per the accepted terminology). This Flow_ID value is defined precluding the bits reserved by the IEEE 802.3 standard with local Ethernet use.

The frames of the second type that include the same given Flow_ID value form the same data flow of the second type. This Flow_ID value is saved and stored in the configuration table of each switch through which the data flow corresponding to this Flow_ID value passes. This provides the ability for this switch to identify each frame and to route that frame in a predetermined manner, according to its configuration table.

For the purposes and within the meaning of the present invention, the Flow_ID value of each frame of the second type is referred to as the identifier of the corresponding frame.

As illustrated in FIG. 3, for a frame $T_2$ that is compliant with the ARINC 664 P3 protocol, the Flow_ID value may be borne for example by the bytes 1 to 3 of the "MAC DEST" field.

Finally, for each data flow of the second type, a priority level is defined and used by each switch 22A, . . . , 22N. This priority level is defined for example for each frame based on the Flow_ID value of this frame according to the configuration table of the corresponding switch 22A, . . . , 22N.

According to the invention, no matter what the priority level of the frames of the second type, the latter is always lower than the priority level of each frame of the first type.

In order to transmit the frames of different types, according to the invention, each input port of each switch 22A, . . . , 22N is configured so as to determine the type of each frame received from the header of this frame and to process this frame in accordance with its type, each frame of the first type being processed on a prioritised basis in relation to each frame of the second type.

In particular, when an input port of one of the switches, for example of the switch 22A, determines that a frame received is of the first type, this switch 22A is capable of processing it in a conventional manner that is typical for frames of the type ARINC 664 P7.

This processing includes in particular the implementation of each subsequent filtering operation by the input port that has received this frame:
identification of the identifier of the frame, that is to say of its value VL, and rejection of this frame when its identifier is not expected according to the configuration table of switch 22A;
Identification of the size of the corresponding frame and rejection of this frame when its size exceeds a threshold value determined according to the configuration table of switch 22A.

If the frame received is not rejected, the corresponding input port is configured so as to transmit this frame to one or more output ports in accordance with the configuration table of the switch 22. This frame is thus placed in a queue associated with the one or more output port(s) in accordance with its priority level, while continuing to have higher priority over each frame of the second type.

In addition, the switch 22A is also configured so as to control compliance by each data flow of the first type with respect to the following values:
bandwidth for this data flow;
jitter;
minimum time delay between frames.

With regard to the frames of the second type, when an input port of one of the switches, for example of switch 22A, determines that a frame received is of the second type, according to a first embodiment of the Invention, the switch is capable of processing it as an Ethernet type frame with predetermined routing, while considering its priority level to be lower than each priority level of each first type frame.

In particular, as in the previous case, such processing tasks comprise the identification of the identifier, that is to say of the Flow_ID value, of the frame received by the input port, and the transmission of this frame to one or more output ports in accordance with the identifier of this frame and in accordance with the configuration table of switch 22A.

In the or each output port, this frame is placed in a queue according to the type and the priority level thereof.

In addition, as in the preceding case, one of the previous filtering operations may be applied to this frame by the corresponding input port.

It can therefore be seen that the first embodiment of the invention provides the means to operationally implement mixability of networks of the types ARINC 664 P7 and Ethernet by using the same physical components, that is to say the same transmission means, the same switches and the same input and output ports.

This then makes it possible to considerably reduce the dimensional footprint and weight of the networks 12 and 14 on board the aircraft 10.

In addition, according to the invention, the operation of the ARINC 664 P7 network is not significantly degraded since the processing of the data flows of this network remains identical to the processing treatment applied in conventional ARINC 664 P7 networks, while in the design considering the Ethernet data flow as an additional level of the lowest priority. In other words, the system during transmission is non-preemptive, which signifies that when a frame of the second type is in the process of being transmitted, this transmission will be completed and in particular, will not be interrupted in the event of arrival of a frame of the second type. The impact on performance at the level of each switch is therefore at a maximum of one frame of maximum size. In fact, the data flows of the ARINC 664 P7 type continue to have higher priority relative to the Ethernet type data flows.

The embodiments described in the following sections relate only to specific processing treatments of data flows of the second type in order to render the network 14 more deterministic.

In particular, in each of these embodiments, each transmitter equipment unit 24A to 24N is configured so as to transmit the frames of the second type included in the same flow with a minimum time delay between frames defined for this data flow and according to a bandwidth defined for this data flow.

The minimum time delay between frames corresponds to a minimum interval of transmission of two consecutive frames of the same data flow.

The bandwidth corresponds to the maximum flow rate or throughput of frames of the same data flow.

These between-frames time delays or "BAG" and these bandwidths are defined in the design phase of the system 10 and are saved and stored in the configuration tables of the corresponding switches 22A, . . . , 22N with the corresponding Flow_ID values.

The data flows of the second type are thus referred to as "BAGed" insofar as properties that are similar to those of the data flows of the first type are associated with these second type data flows.

In this case, it is therefore possible to configure each switch 22A, . . . , 22N in order to control the bandwidth of each incoming data flow and/or its jitter and/or its minimum between-frames time delay.

Thus, according to a second embodiment, the bandwidth of each data flow of the second type is defined independently of the bandwidths of the data flows of the first type.

According to this embodiment, the bandwidths of the second type data flows are therefore not guaranteed given that the data flows of the first type continue to be accorded higher priority over the second type data flows.

According to a third embodiment, the bandwidth of each data flow of the second type is determined as a function of the bandwidths of the data flows of the first type.

This signifies in particular that the bandwidth of each data flow of the second type is defined as the remainder of the maximum bandwidth of the corresponding transmission means after subtracting the bandwidths for the corresponding data flows of the first type and possibly taking into account the reserve bandwidths.

According to a fourth embodiment which it is possible to combine with the second or third embodiment, each transmitting equipment unit 24A, . . . , 24N is capable of defining a total bandwidth for all of the data flows of the second type originating from this transmitting equipment unit 24A, ..., 24N independently of other transmitting equipment units 24A, ..., 24N.

In this case, each total bandwidth is therefore defined locally. Then, based on this total bandwidth, the corresponding transmitting equipment unit 24A, ..., 24N is capable of defining the bandwidth for each data flow originating from this transmitting equipment unit in an equitable or weighted manner.

In particular, in the latter case, the corresponding transmitting equipment unit is able to define a bandwidth for each of its data flows depending for example on the priority level of this data flow, its nature, etc.

According to a fifth embodiment which it is possible to combine with the second or third embodiment, each transmitting equipment unit 24A, ..., 24N is capable of defining a total bandwidth for all of the data flows of the second type originating from this transmitting equipment unit as a function of total bandwidths determined by the other transmitting equipment units 24A, ..., 24N.

In this case, a same given total bandwidth, corresponding to the minimum total bandwidth among all of the total bandwidths defined by the transmitting equipment units 24A, ..., 24N, is allocated to each of the transmitting equipment units 24A, ..., 24N.

Then, as in the previous case, on the basis of the total bandwidth, each transmitting equipment unit defines a bandwidth for each of its data flows in an equitable or weighted manner.

Finally, according to a sixth embodiment which it is possible to combine with the second or the third embodiment, the bandwidth for each data flow of the second type is determined in an automatic and optimised manner, for example by an external tool designed for this purpose.

This tool for example allocates the bandwidths to data flows of the second type according to their priority level, their nature, etc.

Quite obviously, other embodiments and in particular, different ways of determining the bandwidths for the data flows of the second type are also possible.

The invention claimed is:

1. An avionic communication system comprising:
a plurality of switches connected to each other in order to form a computer network;
a plurality of equipment units, each equipment unit being a transmitter or receiver of digital data and being connected to at least one switch;
the system being characterised in that:
each transmitting equipment unit is capable of generating digital data that are present in the form of a plurality of frames, each frame having an identifier and being of a first type or of a second type, the frames of the first type being in compliance with a first protocol and the frames of the second type being in compliance with a second protocol which is different from the first protocol, the frames of a same type having the same identifier forming a data flow of this type;
each switch and each receiving equipment unit are configured so as to determine the type of each frame received and, based on the determined type, to process this frame in accordance with the first protocol or in accordance with the second protocol, each frame of the first type being processed on a prioritised basis in relation to each frame of the second type; and
the first protocol is of the type ARINC 664 P7 and the second protocol is of the type Ethernet with predetermined routing;
wherein each transmitting equipment unit is configured so as to transmit the frames of the second type included in the same data flow according to a bandwidth defined for this data flow,
wherein each transmitting equipment unit is capable of defining a total bandwidth for all second type data flows originating from this transmitting equipment unit independently of the other transmitting equipment units, and from the total bandwidth, the bandwidth for each data flow originating from this transmitting equipment unit, and
wherein the bandwidth for each second type data flow originating from the respective transmitting equipment unit is defined in a weighted manner as a function of the nature of this data flow.

2. A system according to claim 1, wherein each switch is configured so as to determine the type of each frame received based on a field of this frame.

3. A system according to claim 2, wherein the said field corresponds to a header of the corresponding frame.

4. A system according to claim 2, wherein each switch is configured so as to apply a filtering operation to each frame of the second type received in accordance with a predetermined configuration table within this switch, each filtering operation being selected from the group of operations comprising:
identification of the identifier of the corresponding frame and rejection of this frame when its identifier is not expected according to the configuration table; and
identification of the size of the corresponding frame and rejection of this frame when its size exceeds a threshold value determined according to the configuration table.

5. A system according to claim 1, wherein each transmitting equipment unit is configured so as to transmit the frames of the second type included in the same data flow with a minimum time delay between frames defined for this data flow and corresponding to a minimum interval of transmission of two consecutive frames of this data flow.

6. A system according to claim 5, wherein each switch is configured so as to control for each incoming data flow of the second type at least one of the following values:
bandwidth for this data flow;
jitter; and
minimum time delay between frames.

7. A system according to claim 1,
wherein each transmitting equipment unit is configured so as to transmit the frames of the second type included in the same data flow with a minimum time delay between frames defined for this data flow and corresponding to a minimum interval of transmission of two consecutive frames of this data flow; and
wherein the minimum time delay between frames and the bandwidth are defined for each data flow of the second type independently of the bandwidths for the data flows of the first type or as a function of the bandwidths for the data flows of the first type.

8. A system according to claim 1, wherein each transmitting equipment unit is capable of defining a total bandwidth for all of the second type data flows originating from this transmitting equipment unit as a function of the total bandwidth determined by the other transmitting equipment units, and based on this total bandwidth, the bandwidth for each data flow originating from this transmitting equipment unit.

9. A system according to claim 1, wherein the bandwidth for each second type data flow originating from the respective transmitting equipment unit is defined equitably between all of the second type data flows originating from this transmitting equipment unit.

10. A system according to claim 1, wherein the bandwidth for each second type data flow is defined as a function of the nature of this data flow.

11. A system according to claim 1, wherein each switch comprises a plurality of input ports and a plurality of output ports and is configured so as to route each frame of the second type to one or more output ports determined according to the identifier of this frame, in a predetermined manner.

12. A system according to claim 11, wherein each switch is configured so as to receive each frame of the second type via an input port determined according to the identifier of this frame, in a predetermined manner.

13. A system according to claim 1, wherein a priority level is defined for each frame of the first type and for each frame of the second type, the priority level of each frame of the second type being lower than the priority level of each frame of the first type.

\* \* \* \* \*